(12) United States Patent
Feller et al.

(10) Patent No.: US 9,111,120 B2
(45) Date of Patent: Aug. 18, 2015

(54) METHOD FOR CREATING A SECURE DATASET AND METHOD FOR EVALUATING THE SAME

(75) Inventors: Olaf Feller, Ribeauville (FR); Burkhardt Brennecke, Glienicke (DE)

(73) Assignee: cp.media AG (CH)

( * ) Notice: Subject to any disclaimer, the term of this patent is extended or adjusted under 35 U.S.C. 154(b) by 3 days.

(21) Appl. No.: 13/252,861

(22) Filed: Oct. 4, 2011

(65) Prior Publication Data
US 2012/0084569 A1    Apr. 5, 2012

(30) Foreign Application Priority Data

Oct. 4, 2010    (DE) .................. 10 2010 037 948

(51) Int. Cl.
| | | |
|---|---|---|
| H04L 29/06 | (2006.01) | |
| H04L 9/32 | (2006.01) | |
| G06F 21/00 | (2013.01) | |
| G06F 7/04 | (2006.01) | |
| G06F 21/64 | (2013.01) | |
| G06F 21/32 | (2013.01) | |

(52) U.S. Cl.
CPC .............. *G06F 21/645* (2013.01); *G06F 21/32* (2013.01); *G06F 21/64* (2013.01); *G06F 2221/2151* (2013.01); *H04L 9/3223* (2013.01); *H04L 9/3236* (2013.01); *H04L 63/0428* (2013.01); *H04L 63/08* (2013.01); *H04L 63/0861* (2013.01); *H04L 63/123* (2013.01)

(58) Field of Classification Search
CPC . H04L 63/0428; H04L 63/08; H04L 63/0861; H04L 63/123; H04L 9/3236; H04L 9/3223; G06F 2221/2151; G06F 21/64; G06F 21/32
USPC ......... 713/178, 155, 161, 165, 168, 181, 186; 726/26
See application file for complete search history.

(56) References Cited

U.S. PATENT DOCUMENTS

| | | | |
|---|---|---|---|
| 6,269,446 B1* | 7/2001 | Schumacher et al. | 713/176 |
| 7,616,237 B2 | 11/2009 | Fridrich | |
| 2003/0219145 A1* | 11/2003 | Smith | 382/100 |
| 2008/0082831 A1* | 4/2008 | Fujimaki | 713/178 |
| 2009/0110309 A1* | 4/2009 | Sakai et al. | 382/233 |
| 2009/0204818 A1* | 8/2009 | Shin et al. | 713/176 |
| 2010/0262827 A1* | 10/2010 | Steinberg | 713/170 |
| 2010/0302393 A1* | 12/2010 | Olsson et al. | 348/222.1 |
| 2010/0310071 A1* | 12/2010 | Malone et al. | 380/247 |
| 2011/0025851 A1* | 2/2011 | Rumble | 348/148 |
| 2012/0072493 A1* | 3/2012 | Muriello et al. | 709/204 |
| 2012/0072732 A1* | 3/2012 | Canard et al. | 713/176 |
| 2012/0087589 A1* | 4/2012 | Chang-Tsun et al. | 382/190 |

* cited by examiner

*Primary Examiner* — Aravind Moorthy
(74) *Attorney, Agent, or Firm* — Davidson Berquist Jackson & Gowdey, LLP

(57) ABSTRACT

A method is provided for creating a secure dataset using a software application running on a data processing system, wherein the method comprises the following steps: receiving digital image data (1) that represents one or more images, receiving at least one item of additional information (2) relating to the image data (1), creating a data object (3) that comprises the image data (1) and the at least one item of additional information (2), receiving a qualified timestamp (4) that is assigned to the data object (3), and storing the data object (3) in a data-base together with the assigned timestamp (4).

17 Claims, 2 Drawing Sheets

METHOD FOR CREATING A SECURE DATASET AND METHOD FOR EVALUATING THE SAME

RELATED APPLICATION

The present application claims benefit to German Patent Application No. 10 2010 037 948.4 filed Oct. 4, 2010, which is incorporated by reference herein.

FIELD OF THE INVENTION

The invention relates to a method for creating a secure dataset and to a method for evaluating such a dataset.

BACKGROUND

Manipulating digital photos with conventional photo editing software is generally very easy. While editing photos may be quite permissible in a private setting, in other procedures, such as lawsuits where the photo is to be used as evidence, it must be possible to prevent subsequent manipulation altogether. However, photos have little probative value because they are so easy to alter.

A method is known from U.S. Pat. No. 7,616,237 B2 that can be used to demonstrate whether a photo has been created with a given digital camera. For this, several photos are taken with the camera. A reference sample is calculated from these several photos representing an approximation of a signal noise in the photos. A noise pattern is determined for a test image. The noise pattern is compared with the reference sample and on this basis it is determined whether the test image was created with the digital camera. In this way, the method is similar to the ballistics testing of a projectile to determine whether the projectile was fired from a given gun.

SUMMARY

One object consistent with the present invention is to provide improved methods for creating a secure dataset and evaluating said dataset. In this way, it is intended to increase evidentiary reliability and guarantee that the dataset may be verified subsequently.

This object may be solved by a method for creating a secure dataset and a method for evaluating a secure dataset.

One aspect of the invention relates to a method for creating a secure data set using a software application that is installed on a data processing system, wherein the method comprises the following steps: receiving digital image data that represents one or more images, receiving at least one additional item of information about the image data, generating a data object that comprises the image data and the at least one additional item of information, receiving a qualified timestamp assigned to the data object, and storing the data object in a database together with the timestamp assigned thereto.

According to another aspect of the invention, a method is provided for evaluating a secure dataset, which dataset comprises a data object and a qualified timestamp assigned to the data objet, wherein the method comprises the following steps: reading in the data object and the timestamp assigned to the data object, and verifying the authenticity of the timestamp.

BRIEF DESCRIPTION OF THE DRAWINGS

In the following, the invention will be described in greater detail using to exemplary embodiments thereof and with reference to the figures of a drawing. In the figures

DETAILED DESCRIPTION

Figure 1:
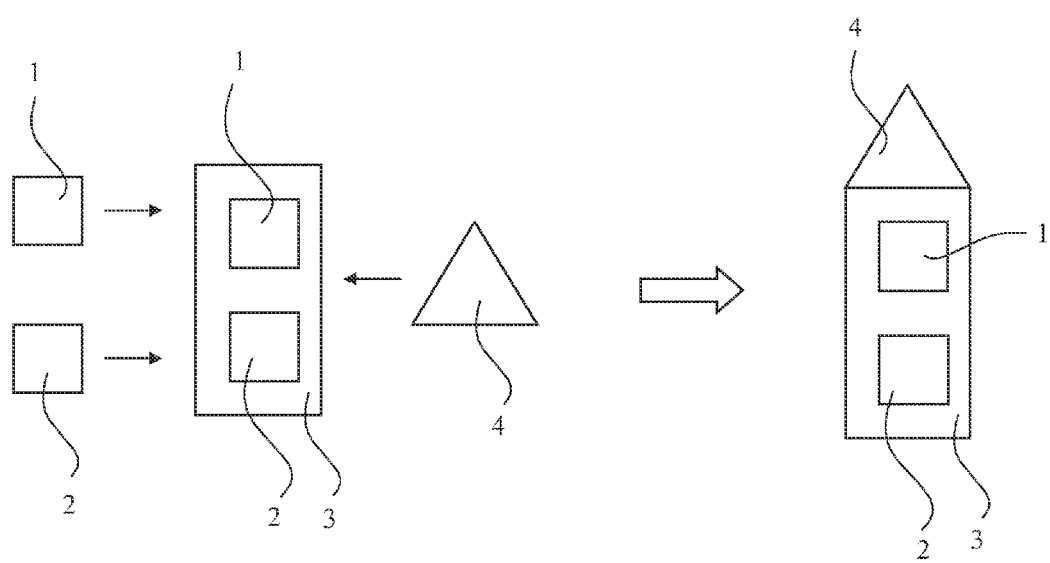
FIG. 1 shows a schematic view of a method for creating a secure dataset using a software application running on a data processing system (called SecDoc)

In accordance with the invention, it becomes possible to create a secure dataset. A dataset is thus created by storing at least one item of additional information together with digital image data that represents one or more images. The at least one item of additional information specifies for example information regarding the capture of the image data. An evaluation of the at least one item of additional information enables a plausibility check to be carried out on the image data.

The method further provides for assigning a qualified timestamp to a data object with image data and the at least one item of additional information. Timestamps are digital data conforming to ISO18014-1, with which the existence of certain data before a given point in time can be proven. Timestamps are often created by using digital signatures, as is the case with the Time Stamp Protocol from RFC3161, for example. In this way, timestamps represent an electronic certification to the effect that the data signed with the timestamp was present in the signed form at the time of the signature. The qualified timestamp is a legally certain guarantee that the data object existed at the time indicated by the timestamp. Legally certain qualified timestamps can only be created by accredited suppliers (trusted timestamp authority). The validity of electronic documents with a qualified timestamp is verifiable for a period of at least 30 years. The timestamp assures a high level of invulnerability to falsification for the data object.

Combining the image data with the at least one additional item of information and the qualified time stamp lends the dataset a high level of probative security. This renders the dataset legally certain.

The digital image data is captured using a digital photosensor, for example a digital camera or a mobile phone with camera function (camera phone).

With the method for evaluating a secure dataset, the validity of the timestamp is verified. It may be provided that verification is performed by comparing the timestamp with an archived specimen of the timestamp. If the timestamp cannot be verified, the dataset is deemed to have been tampered with and cannot be submitted as evidence.

One embodiment consistent with the invention provides that the at least one additional item of information includes time information specifying the exact time when the image data was captured. The following alternatives may be provided for recording the time information. Most digital cameras are already equipped with a time recording device with which it is possible to store the time information at the point in time when the image data of an image is captured. Alternatively, the image data may be recorded using a camera phone. In this case, the network time of the mobile phone network may be used to capture the time information. As another alternative, a time signal from a time signal transmitter, for example in Mainflingen, may be recorded using a suitable receiver. In a further alternative, it may also be provided to record a global positioning (GPS) time signal, which indicates coordinated universal time (UTC).

In accordance with the invention, it may be provided that the at least one additional item of information comprises an item of information about the environment in which the image data was captured. In this context, it may be provided that the environmental information comprises at least one item of parameter information selected from the following group: time, temperature, air pressure, atmospheric humidity, brightness, terrestrial magnetic field, electric field strength, signal strength of a reference source, audio volume, frequency spectrum, chemical data, biological data, data relating to an applied force and weight.

For example, it may be provided to capture information as environmental information via a mobile phone cell of a mobile phone network. Alternatively or additionally, the location may be determined by means of a global satellite system, GPS for example. By these means, it is possible to ensure extremely precise determination of the location where the image data was collected.

Further information regarding the ambient conditions present in the environment where the image data was collected, such as temperature, air pressure, atmospheric humidity, brightness, the strength of the terrestrial magnetic field, the electric field strength, the signal strength of a reference source, the audio volume, the frequency spectrum, chemical data, biological data, data relating to an applied force and weight, may also be captured using suitable sensors. The recording and evaluation of environmental information reinforces the plausibility of the image data.

An advantageous embodiment consistent with the invention provides that the at least one additional item of information comprises device information relating to a photosensor with which the image data was captured. It may preferably be provided that the device information comprises a serial number of the photosensor. Alternatively or additionally, it may be provided to record information about the SIM card of a camera phone. As a further alternative or additionally thereto, it may be provided to record an orientation and/or acceleration of a photosensor, by means of a GPS system for example.

An embodiment provides that the image data represents an object image and a user image of a user who captured the object image. In this way, it is possible to associate the user with the object image, which further increases the evidentiary reliability of the dataset. It may be provided that the object image and the user image with a digital photosensor are captured immediately one after the other. Alternatively it may be provided that the object image and the user image are captured simultaneously via a forwards-backwards camera.

In one embodiment, it may be provided that the software application includes a signature unit via which a user of the software application is authenticated. A user must have himself authenticated by the signature unit using a personally valid user signature before he is able to use the software application. In this way, it is ensured that only authorized users may have access to the software application. The user signature preferably has the form of a qualified user signature. The qualified user signature may be integrated in a storage unit, for example an SD or micro SD card. Alternatively, the user signature may be integrated in the software application as a program implementation. In both cases, it may be provided that the user identifies himself by entering an authentication key.

An advantageous embodiment of the invention provides that user signature data from the user signature is received and the data object is created comprising the image data, the at least one item of additional information and the user signature data. In this way, it is always possible to identify the user during evaluation of the dataset. Alternatively it may be provided that the user signature data comprises a machine signature that uniquely identifies a machine.

In one embodiment of the invention, it may be provided that the software application is furnished with an electronic application signature. The application signature serves to prevent the software from being tampered with. It is preferably provided that application signature data from the application signature is received and the data object is created comprising the image data, the at least one item of additional information and the application signature data. In this way, it is always possible to identify the software version of the software application when evaluating a dataset, which is advantageous for auditing purposes.

In an embodiment consistent with the invention, it may be provided that supplementary data is received and the data object is created comprising the image data, the at least one item of additional information and the supplementary data. It may be provided that the supplementary data represents electronic copies of one or more documents. The image data preferably comprises one or more photos of an author of the documents, so that it is possible to associate the documents with the author when the dataset is evaluated. Alternatively or additionally, it may be provided that the image data comprises photos of individuals who signed the documents, such documents being contracts, for example. In one embodiment, it may be provided that the supplementary data comprises one or more emails. To this end it may be provided that the image data includes one or more photos of a sender of the email.

One embodiment provides that the supplementary data comprises a representative value that is assigned to a sequenced datastream. A continuous datastream is divided into multiple sequences in a time interval that is delimited by a start time and an end time. The division is preferably performed synchronously in accordance with a predefined cycle. Alternatively, it may be provided that the division is performed asynchronously, for example controlled by a user. Hash values are assigned to each of the multiple sequences in accordance with known methods and organised in a hash tree. The top of the hash tree corresponds to the representative value of the sequenced datastream. In this way, the multiple sequences are mapped to a single representative value. The sequenced datastream preferably comprises audio data, video data, a measuring datastream supplied by a measuring and/or control device, bank data recording the transaction at a dispensing machine, for example a cash dispensing machine, fax data recording the transmission of a fax, and/or data relating to a digital data transaction.

One embodiment provides that the method for evaluating a secure dataset comprises the following further steps: providing a reference sample of a digital photosensor, comparing a noise pattern from the image data included in the dataset with the reference sample, and determining whether the noise pattern has correlations with the reference sample.

The method is based on a property according to which each digital photosensor leaves its own, unmistakeable noise pattern in the image data taken with that photosensor. By comparing the noise pattern in the image data of a dataset with a reference sample of a digital photosensor, it is possible to determine whether the image data of the dataset was captured by that digital photosensor. Falsifications are thus detected quickly and reliably.

Another embodiment may provide that the reference sample is created using a reference application that runs on a data processing system and includes the following steps: receiving reference image data that represents multiple reference images, generating the reference sample from the reference image data, receiving a qualified reference timestamp that is assigned to the reference sample, and storing the reference sample in a database together with the assigned reference timestamp.

FIG. 1 shows a schematic view of a method for creating a secure dataset using a software application running on a data processing system. Image data (1) representing one or more images is received. At least one item of additional information (2) relating to the image data (1) is received. In one embodiment, the image data (1) and/or the at least one item of additional information (2) is received via a secure connection. The secure connection may be in the form of a secure sockets layer (SSL) or a hypertext transport protocol secure (HTTP) connection, for example.

In one embodiment, the image data (1) comprises an object image and a user image of a user who captured the object image. This enables the user to be identified. This also makes it possible to associate the user with the object photo. Thus, the user may also be incorporated as a witness in evidentiary proceedings. The association of the user with the object image is rendered particularly secure if the object image and the user image are captured simultaneously via a forwards-backwards camera.

In one embodiment it may be provided that the at least one additional item of information (2) comprises an item of time information specifying the point in time when the image data was captured, and an item of environmental information indicating the location where the image data was captured. The information regarding time and place may be determined for example from a mobile phone network as the network time and the mobile phone cell.

A data object (3) comprising the image data (1) and the at least one item of additional information (2) is created. A hash value associated with the data object (3) is calculated. As far as possible, the hash value must be generated without conflicts. Suitable hash functions for calculating the hash value are for example "SHA256" and "SHA512" from the SHA-2 Hash-Algorithm Group of the National Security Agency (NSA) or the Whirlpool Algorithm of the European NESSIE project (New European Schemes for Signatures, Integrity, and Encryption, IST-1999-12324).

In one embodiment it may be provided that the software application is furnished with a signature unit. User signature data of the signature unit, which serves to authenticate a user as an authorised user, is received by the software application. The data object (3) is generated and comprises the image data (1), the at least one item of additional information (2) and the user signature data. The hash value for the data object (3) is calculated. In a further embodiment, it is provided that the software application is furnished with an application signature for auditing purposes. Application signature data of the application signature is received. The data object (3) is generated and comprises the image data (1), the at least one item of additional information (2), the user signature data and/or the application signature data.

The hash value is transmitted to an officially recognized time stamp authority. It may be transmitted via a broadband network connection, for example transmission control protocol (TCP) or a narrowband network connection such as short message service (SMS). If a narrowband network is used, transmission takes place in multiple packets. Encrypted transmission of the hash value may be provided by using an encrypted network protocol, for example SSL, HTTPS or IPV6sec.

The time stamp authority generates a timestamp for the hash value and sends it back. Thus, a qualified timestamp (4) associated with the data object (3) is received. In this way, it is provable with legal certainty that the data object with the image data and the supplementary information existed at the time indicated by the timestamp. When a request is submitted to the time stamp authority for the first time, it may be provided that the timestamp is transmitted together with a certificate. The certificate may be stored in the data processing system. Subsequent requests for timestamps submitted to the same time stamp authority may then be answered with timestamps without a certificate. This reduced the volume of data that has to be transmitted.

Finally, the data object (3) is stored in a database together with the associated timestamp (4) and if applicable with the signature of the application.

Figure 2:
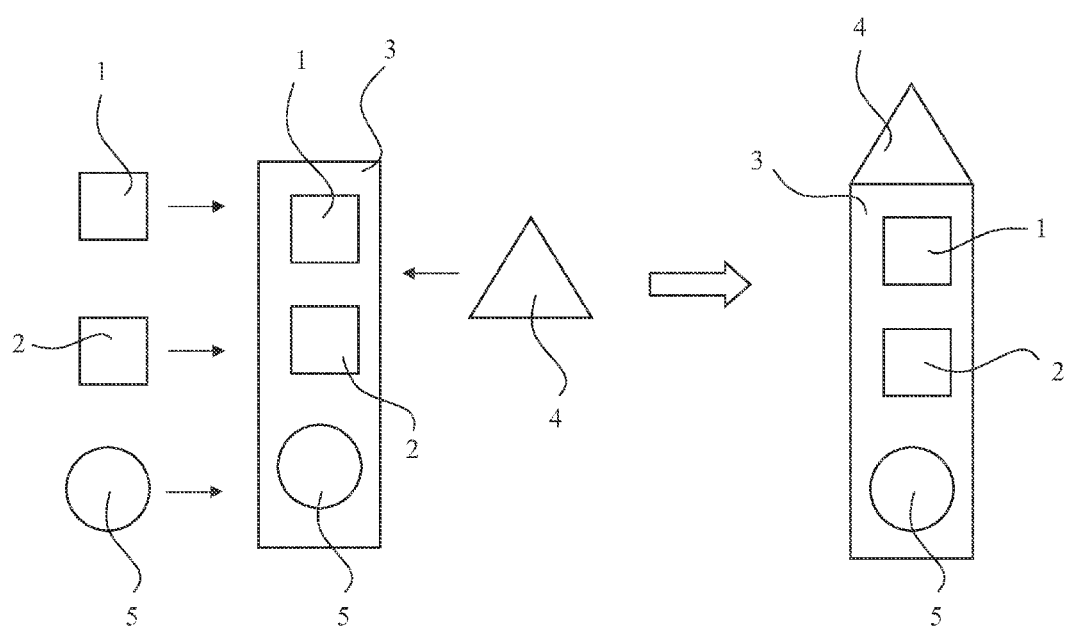
FIG. 2 shows a schematic view of an alternative embodiment of a method for creating a secure dataset using a software application running on a data processing system (called SecStream).

FIG. 2 shows a schematic view of an alternative embodiment of a method for creating a secure dataset using a software application running on a data processing system. Elements that are the same as in FIG. 1 are identified using the same reference numbers.

Image data (1), at least one item of additional information (2), and a representative value (5) of a sequenced datastream are received. A data object (3) comprising the image data (1), the at least one item of additional information (2) and the representative value (5) is generated. A timestamp (4) associated with the data object (3) is received and the data object (3) is stored I a database together with the associated timestamp (4).

In one embodiment, the datastream may be a fax datastream of a fax transmission. At a start time, a photo of a sender of the fax is captured and the fax transmission is begun. Transmission of the fax ends at an end time, when optionally another photo of the sender may be captured. The fax datastream between the start time and the end time is divided into multiple sequences. Sequence hash values are assigned to each of the multiple sequences, and these are organised in a hash tree. The top of the hash tree constitutes a representative value (5) of the datastream. Datastreams of audio data, video data, a measurement datastream supplied from a measuring and/or control device, bank data capturing the transaction at a dispensing machine, for example a cash dispensing machine and/or data relating to a digital transaction may also be sequenced in similar manner.

In order to evaluate a secure dataset comprising a data object and a qualified timestamp assigned to the data object, the validity of the timestamp is verified. This is done for example by comparing it with an archived timestamp. If the verification of the timestamp fails, the dataset is considered to have been tampered with.

The following is an explanation of the creation of a reference pattern for the subsequent evaluation of a dataset.

Reference image data representing a plurality of reference images is provided by means of a digital photosensor, for example a digital camera or a camera phone. In one embodiment, reference image data corresponding to ten reference images is captured.

The reference image data is received by a reference application that is furnished in one embodiment with a reference signature. A reference pattern ("digital fingerprint") is created from the reference image data, for example according to the method described in the document U.S. Pat. No. 7,616,237 B2. A reference timestamp is created and received in similar manner to the steps described previously. The reference patter is stored in a database together with the assigned reference timestamp.

In order to evaluate a dataset that has been created according to the preceding method, a noise sample taken from the image data is compared with the reference pattern. In this way, it is possible to determine whether there is a correlation between the reference pattern and the noise sample, and thus also whether the image data was indeed captured using the digital photosensor for which the reference pattern was generated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for creating a secure dataset by means of a software application running on a data processing system, wherein the method comprises the following steps:
receiving digital image data that represents an object image and a user image of a user who has captured the object image, with the object image and the user image being captured simultaneously via a forwards-backwards camera; receiving at least one additional item of information about the digital image data in the form of information regarding the ambient conditions present in the environment where the image data was collected; generating a data object that comprises the image data and the at least one additional item of information; calculating a hash value associated with the data object; transmitting the hash value to a trusted timestamp authority; receiving a qualified timestamp assigned to the hash value of the data object from the trusted timestamp authority; and storing the data object in a database together with the timestamp assigned thereto.

2. The method of claim 1, wherein the at least one additional item of information further comprises an item of time information indicating the point in time when the digital image data was recorded.

3. The method of claim 1, wherein the at least one additional item of information further comprises an item of additional environmental information about the surroundings in which the digital image data was recorded.

4. The method of claim 3, wherein the additional environmental information comprises at least one item of parameter information selected from the following group: temperature, air pressure, atmospheric humidity, brightness, terrestrial magnetic field, electric field strength, signal strength of a reference source, audio volume, frequency spectrum, chemical data, biological data, data relating to an applied force and weight.

5. The method of claim 1, wherein the at least one additional item of information further comprises an item of device information relating to a photosensor with which the digital image data was recorded.

6. The method of claim 5, wherein the device information is at least one item of information selected from the following group: serial number of the photosensor, orientation of the photosensor and acceleration of the photosensor.

7. The method of claim 1, wherein the digital image data represents an object image and a user image of a user who has recorded the object image.

8. The method of claim 1, wherein the software application is furnished with a signature unit with which a user of the software application is authenticated by means of a user signature.

9. The method of claim 8, wherein user signature data is received and the data object is generated comprising the digital image data, the at least one additional item of information and the user signature data.

10. The method of claim 1, wherein the software application is furnished with an electronic application signature.

11. The method of claim 10, wherein application signature data of the electronic application signature is received and the data object is generated comprising the digital image data, the at least one additional item of information and the application signature data.

12. The method of claim 1, wherein supplementary data is received and the data object is generated comprising the digital image data, the at least one additional item of information and the supplementary data.

13. The method of claim 12, wherein the supplementary data comprises a representative value that is assigned to a sequenced datastream.

14. A method for evaluating a secure dataset comprising a data object and a qualified timestamp assigned to the data object, wherein the dataset is created by the steps of:
receiving digital image data that represents an object image and a user image of a user who has captured the object image, with the object image and the user image being captured simultaneously via a forwards-backwards camera;
receiving at least one additional item of information about the digital image data in the form of information regarding the ambient conditions present in the environment where the image data was collected;
generating a data object that comprises the image data and the at least one additional item of information;
calculating a hash value associated with the data object; transmitting the hash value to a trusted timestamp authority; receiving a qualified timestamp assigned to the hash value of the data object from the trusted timestamp authority; and
storing the data object in a database together with the timestamp assigned thereto;
wherein evaluating compromises the additional steps of:
reading in the data object and the timestamp assigned to the data object, and
verifying the authenticity of the timestamp.

15. The method of claim 14, including the steps of:
providing a reference sample of a digital photosensor;
comparing a noise pattern from the digital image data included in the dataset with the reference sample; and
determining whether the noise pattern has correlations with the reference sample.

16. The method of claim 15, wherein the reference sample is created using a reference application that runs on a data processing system, and includes the additional steps of:
receiving reference image data that represents multiple reference images;
generating the reference sample from the reference image data;
receiving a qualified reference timestamp that is assigned to the reference sample; and
storing the reference sample in a database together with the assigned reference timestamp.

17. A method for creating a secure dataset by means of a software application running on a data processing system, wherein the method comprises the following steps:
receiving digital image data that represents an object image and a user image of a user who has captured the object image, with the object image and the user image being captured simultaneously via a forwards-backwards camera;
receiving at least one additional item of information about the digital image data in the form of information regarding the ambient conditions present in the environment where the image data was collected;

generating a data object that comprises the image data and the at least one additional item of information;

calculating a hash value associated with the data object; transmitting the hash value to a trusted timestamp authority; receiving a qualified timestamp assigned to the hash value of the data object from the trusted timestamp authority; and storing the data object in a database together with the timestamp assigned thereto.

\* \* \* \* \*